(12) United States Patent
Kitashiba et al.

(10) Patent No.: US 10,974,775 B2
(45) Date of Patent: Apr. 13, 2021

(54) AERODYNAMIC COVER OF VEHICLE

(71) Applicant: TOYOTA JIDOSHA KABUSHIKI KAISHA, Toyota (JP)

(72) Inventors: Shunsuke Kitashiba, Nagoya (JP); Yasuyuki Yokozawa, Toyota (JP); Takashi Tomita, Toyota (JP); Seiichiro Kawanishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 88 days.

(21) Appl. No.: 16/531,722

(22) Filed: Aug. 5, 2019

(65) Prior Publication Data
US 2020/0114987 A1  Apr. 16, 2020

(30) Foreign Application Priority Data
Oct. 15, 2018  (JP) .............................. JP2018-193990

(51) Int. Cl.
*B62D 35/02* (2006.01)
*B60G 3/10* (2006.01)

(52) U.S. Cl.
CPC .............. *B62D 35/02* (2013.01); *B60G 3/10* (2013.01); *B60G 2204/20* (2013.01); *B60G 2204/4308* (2013.01)

(58) Field of Classification Search
CPC .. B62D 35/02; B60G 2204/4308; B60G 7/00; B60G 7/001; Y02T 10/82
USPC .................................................. 280/124.134
See application file for complete search history.

(56) References Cited

FOREIGN PATENT DOCUMENTS

| EP | 2476565 A1 * | 7/2012 | ............. B60G 7/001 |
| JP | 2009-196557 A | 9/2009 | |
| WO | WO-2013083896 A1 * | 6/2013 | ......... B60R 13/0861 |

* cited by examiner

*Primary Examiner* — Paul N Dickson
*Assistant Examiner* — Matthew D Lee
(74) *Attorney, Agent, or Firm* — Sughrue Mion, PLLC

(57) ABSTRACT

An aerodynamic cover of a suspension device of a vehicle includes an upper horizontal portion that is located on an upper side of the arm member and extends in a horizontal direction, a lower horizontal portion that is located under the arm member and extends in the horizontal direction, an engaging portion that is provided on one of the upper and lower horizontal portions and engaged with the arm member, and a bolt receiving portion that is provided on the other horizontal portion and bolted to the arm member. The engaging portion includes an arm portion extending in the horizontal direction, and a claw portion provided on a distal side of the arm portion and engaged with the arm member. A rib provided on the arm portion extends in a direction of extension of the arm portion, and protrudes in a vertical direction with respect to the arm portion.

3 Claims, 7 Drawing Sheets

AERODYNAMIC COVER OF VEHICLE

INCORPORATION BY REFERENCE

The disclosure of Japanese Patent Application No. 2018-193990 filed on Oct. 15, 2018 including the specification, drawings and abstract is incorporated herein by reference in its entirety.

BACKGROUND

1. Technical Field

The disclosure relates to an aerodynamic cover of a vehicle. In particular, the disclosure is concerned with an improvement of the structure of the aerodynamic cover mounted on an arm member of a suspension device.

2. Description of Related Art

As disclosed in Japanese Unexamined Patent Application Publication No. 2009-196557 (JP 2009-196557 A), an aerodynamic cover (which is called "lower cover" in JP 2009-196557 A) is known which is mounted on an arm member (which is called "lower arm" in JP 2009-196557 A) of a suspension device of a vehicle. The aerodynamic cover is provided for reducing air resistance (traveling resistance) and improving the fuel consumption rate by regulating air that flows under the vehicle (under a floor) during traveling of the vehicle, and for protecting the suspension device against flying stones, etc.

Generally, in a structure for mounting this type of aerodynamic cover on the arm member, the aerodynamic cover is bolted at two or more locations to the arm member. The aerodynamic cover disclosed in JP 2009-196557 A is also presumed to be bolted at two opposite locations as viewed in the vehicle width direction, to the arm member.

SUMMARY

However, when the aerodynamic cover is bolted at two or more locations to the arm member, it is necessary to perform operation to screw a bolt, at each of the bolting locations. Since some work time is required for the bolt screwing operation, there is a limitation to reduction of the time required for installing the aerodynamic cover, due to the presence of the two or more bolting locations.

The inventors considered partially engaging the aerodynamic cover with the arm member, in order to reduce the number of the bolting locations. Namely, the inventors considered providing the aerodynamic cover with an engaging portion or portions, in place of the bolting locations. In this case, however, the engaging portion may become worn due to sliding motion of the engaging portion and the arm member relative to each other, which is caused by vibration, etc. of the vehicle, and the aerodynamic cover may not be kept in a stably installed condition.

This disclosure provides an aerodynamic cover which has a reduced number of bolting locations where the aerodynamic cover is bolted to an arm member of a suspension device, with a reduced length of time required for installing the cover, and can also be kept in a stably installed condition.

One aspect of the disclosure is concerned with an aerodynamic cover mounted on an arm member of a suspension device of a vehicle. The aerodynamic cover includes an upper horizontal portion that is located on an upper side of the arm member and extends in a horizontal direction, a lower horizontal portion that is located on a lower side of the arm member and extends in the horizontal direction, an engaging portion that is provided on one horizontal portion of the upper horizontal portion and the lower horizontal portion, and is engaged with the arm member, and a bolt receiving portion that is provided on the other horizontal portion of the upper horizontal portion and the lower horizontal portion, and is bolted to the arm member. The engaging portion includes an arm portion that extends in the horizontal direction, and a claw portion that is provided on a distal side of the arm portion and is engaged with the arm member, and a rib is provided on at least the arm portion of the engaging portion, such that the rib extends in a direction of extension of the arm portion, and protrudes in a vertical direction.

In the aerodynamic cover according to the above aspect, the engaging portion provided on one horizontal portion of the upper horizontal portion and the lower horizontal portion is engaged with the arm member of the suspension device, and the bolt receiving portion provided in the other horizontal portion is bolted to the arm member. Namely, no bolt is fastened to the above-indicated one horizontal portion; therefore, the number of the bolting locations can be reduced, and the time required for screwing the bolt(s) in the process of installation of the aerodynamic cover can be reduced. Also, at least the arm portion of the engaging portion is provided with the rib that extends in the direction of extension of the arm portion and protrudes in the vertical direction with respect to the arm portion, so that the strength of the arm portion is increased. Thus, even if the engaging portion becomes worn due to sliding motion of the arm portion of the engaging portion and the arm member relative to each other, which is caused by vibration, etc. of the vehicle, the arm portion and the arm member can be kept in a stable engaged condition, due to the presence of the rib, and the aerodynamic cover can be kept in a stably installed condition.

In the aerodynamic cover as described above, the engaging portion may be provided on the lower horizontal portion, and the arm portion may include a first surface, and a second surface opposite to the first surface. The first surface is a flat contact surface that is in abutting contact with a lower surface of the arm member. The rib protrudes from the second surface downward in the vertical direction perpendicular to the second surface.

With the above arrangement, the contact surface (contact surface that is in abutting contact with the lower surface of the arm member) of the arm portion is a flat surface, and the engaging portion can be stably in contact with the arm member. Also, the rib protrudes downward in the vertical direction perpendicular to the second surface (the surface opposite to the contact surface that is in contact with the lower surface of the arm member); therefore, the strength of the arm portion is increased. Namely, while the engaging portion is stably in abutting contact with the arm member, the aerodynamic cover can be kept in a stably installed condition, due to the presence of the rib.

In the aerodynamic cover as described above, the bolt receiving portion may protrude in the vertical direction from a surface of the other horizontal portion opposite to the arm member, and the bolt receiving portion may be secured to the arm member with a bolt, such that an end face of the bolt receiving portion which is located on an outer side as viewed in a direction of protrusion of the bolt receiving portion provides a seating face with which a head portion of the bolt contacts.

With the above arrangement, when the aerodynamic cover is bolted to the arm member via the bolt receiving portion, the end face of the bolt receiving portion provides the seating face with which the head portion of the bolt contacts. Since the bolt receiving portion protrudes in the vertical direction from the surface of the other horizontal portion opposite to the arm member, the head portion of the bolt is less likely or unlikely to contact with the surface of the other horizontal portion, even in a situation where the head portion of the bolt presses the seating face (end face of the bolt receiving portion) and causes the seating face to wear, due to fastening force applied when the bolt is fastened. Namely, the surface of the horizontal portion is less likely or unlikely to be worn by the bolt. Thus, the rigidity of the other horizontal portion is kept high (the rigidity of the aerodynamic cover is kept high), and the effects (reduction of air resistance and protection of the suspension device) provided by installation of the aerodynamic cover can be favorably exhibited.

In the aerodynamic cover according to the above aspect, one horizontal portion of the upper horizontal portion and the lower horizontal portion is provided with the engaging portion with which the arm member of the suspension device is engaged, and at least the arm portion of the engaging portion is provided with the rib that extends in the direction of extension of the arm portion and protrudes in the vertical direction with respect to the arm portion. With this arrangement, it is possible to keep the aerodynamic cover in a stably installed condition, while reducing the number of bolting locations and thus reducing the time required for installation of the aerodynamic cover.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

One embodiment will be described based on the drawings. In this embodiment, the disclosure is applied to an aerodynamic cover mounted on a second lower arm of a suspension device that suspends a rear wheel of a vehicle.

The structure of the suspension device will be generally described, before the structure of the aerodynamic cover and installation of the aerodynamic cover are described.

Structure of Suspension Device

Figure 1:
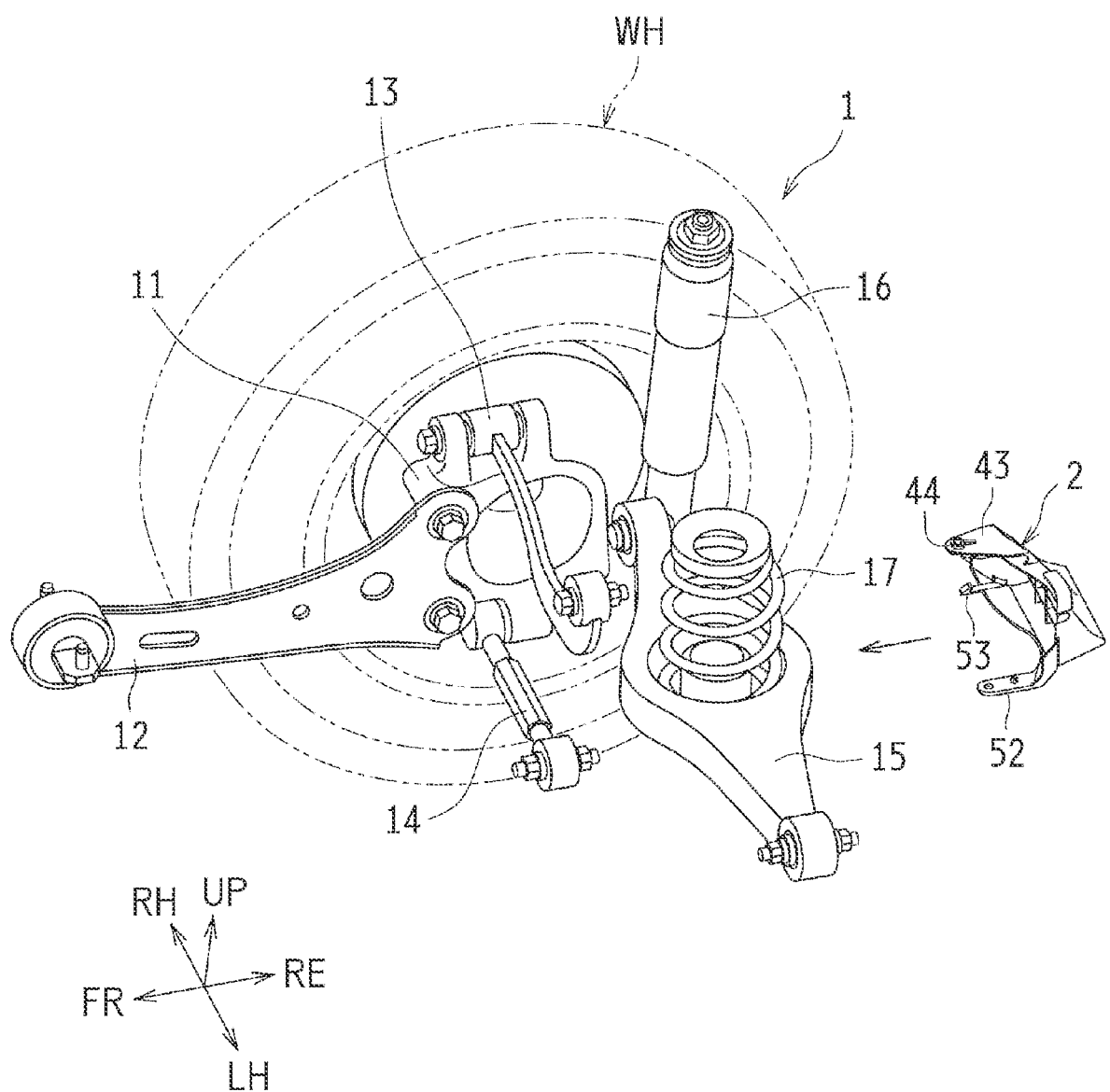
FIG. 1 is a perspective view useful for describing the direction of mounting of an aerodynamic cover on a suspension device in one embodiment.

FIG. 1 is a perspective view useful for describing a direction in which an aerodynamic cover (which will also be called "lower cover") 2 is mounted on a suspension device 1 in this embodiment. The suspension device 1 shown in FIG. 1 is used for suspending a right, rear wheel WH (indicated by virtual lines in FIG. 1) of the vehicle. A suspension device for suspending a left, rear wheel of the vehicle, which is not illustrated herein, has a symmetric structure with respect to the suspension device 1 for suspending the right, rear wheel WH. In FIG. 1, arrow FR denotes the front direction of the vehicle, arrow RE denotes the rear direction of the vehicle, arrow RH denotes the right-hand direction of the vehicle, arrow LH denotes the left-hand direction of the vehicle, and arrow UP denotes the upper direction.

The suspension device 1 includes a carrier 11 that rotatably supports the right, rear wheel (which may be called "wheel") WH, a trailing arm 12 that is connected to the carrier 11, and serves as a suspension arm for suspending the wheel WH, an upper arm 13, a first lower arm 14, and a second lower arm (which may be regarded as "arm member") 15. The suspension device 1 also includes shock absorber 16 and coil spring 17 for absorbing or damping vibration caused by a load applied from a road.

The trailing arm 12 extends in the vehicle longitudinal direction, and its front end portion is swingably supported by a vehicle body about an axis that extends in the vehicle width direction, via a rubber bushing, for example. A rear end portion of the trailing arm 12 is connected at two locations, via bolts, or the like, to a front end portion of the carrier 11. The upper arm 13 extends in the vehicle width direction, and its outer portion as viewed in the vehicle width direction is supported by the upper part of the carrier 11, via a rubber bushing, or the like, such that it is swingable about an axis that extends in the vehicle longitudinal direction, while its inner portion as viewed in the vehicle width direction is supported by the vehicle body, via a rubber bushing, or the like, such that it is swingable about an axis that extends in the vehicle longitudinal direction.

The first lower arm 14, which is located below the upper arm 13, extends in the vehicle width direction, and its outer portion as viewed in the vehicle width direction is supported by a front end portion of the lower part of the carrier 11, via a rubber bushing, or the like, such that it is swingable about an axis that extends in the vehicle longitudinal direction, while its inner portion as viewed in the vehicle width direction is supported by the vehicle body, via a rubber bushing, or the like, such that it is swingable about an axis that extends in the vehicle longitudinal direction.

The second lower arm 15, which is located rearward (in the rear direction) of the first lower arm 14, extends in the vehicle width direction, and its outer portion as viewed in the vehicle width direction is supported by a rear end portion of the lower part of the carrier 11, via a rubber bushing, or the like, such that it is swingable about an axis that extends in the vehicle longitudinal direction, while its inner portion as viewed in the vehicle width direction is supported by the vehicle body, via a rubber bushing, or the like, such that it is swingable about an axis that extends in the vehicle longitudinal direction. A middle portion of the second lower arm 15 as viewed in the vehicle width direction assumes a bulging shape, namely, is extended or enlarged in the vehicle longitudinal direction, and a coil spring 17 is installed in the middle portion.

With the support structure of the wheel WH having various arms 12, 13, 14, 15 and the carrier 11, the wheel WH is supported such that it can swing vertically relative to the vehicle body.

The shock absorber 16 extends in the vertical direction of the vehicle. The shock absorber 16 is connected at its upper end to the vehicle body, and is connected at its lower end to the second lower arm 15. The shock absorber 16 functions to damp vibration in the vertical direction of the wheel WH, which is transmitted via the carrier 11. The coil spring 17 also extends in the vertical direction of the vehicle. The coil spring 17 is connected at its lower end to the middle portion of the second lower arm 15, and is connected at its upper end to the vehicle body. The coil spring 17 absorbs vibration generated between the vehicle body and the wheel WH. The shock absorber 16 cooperates with the coil spring 17 to buffer and damp vibration and impact generated via the wheel WH.

As shown in FIG. 1, the aerodynamic cover 2 is mounted on the second lower arm 15 from its rear side. The aerodynamic cover 2 is made of resin (e.g., made of polypropylene), and serves to prevent flying stones and curbstones from colliding with the second lower arm 15. Namely, the aerodynamic cover 2 protects the second lower arm 15. Also, the aerodynamic cover 2 contributes to reduction of air resistance (traveling resistance) and improvement of the fuel consumption rate, by regulating air that flows under the vehicle (under the floor) during traveling of the vehicle.

Structure of Aerodynamic Cover

Figure 2:
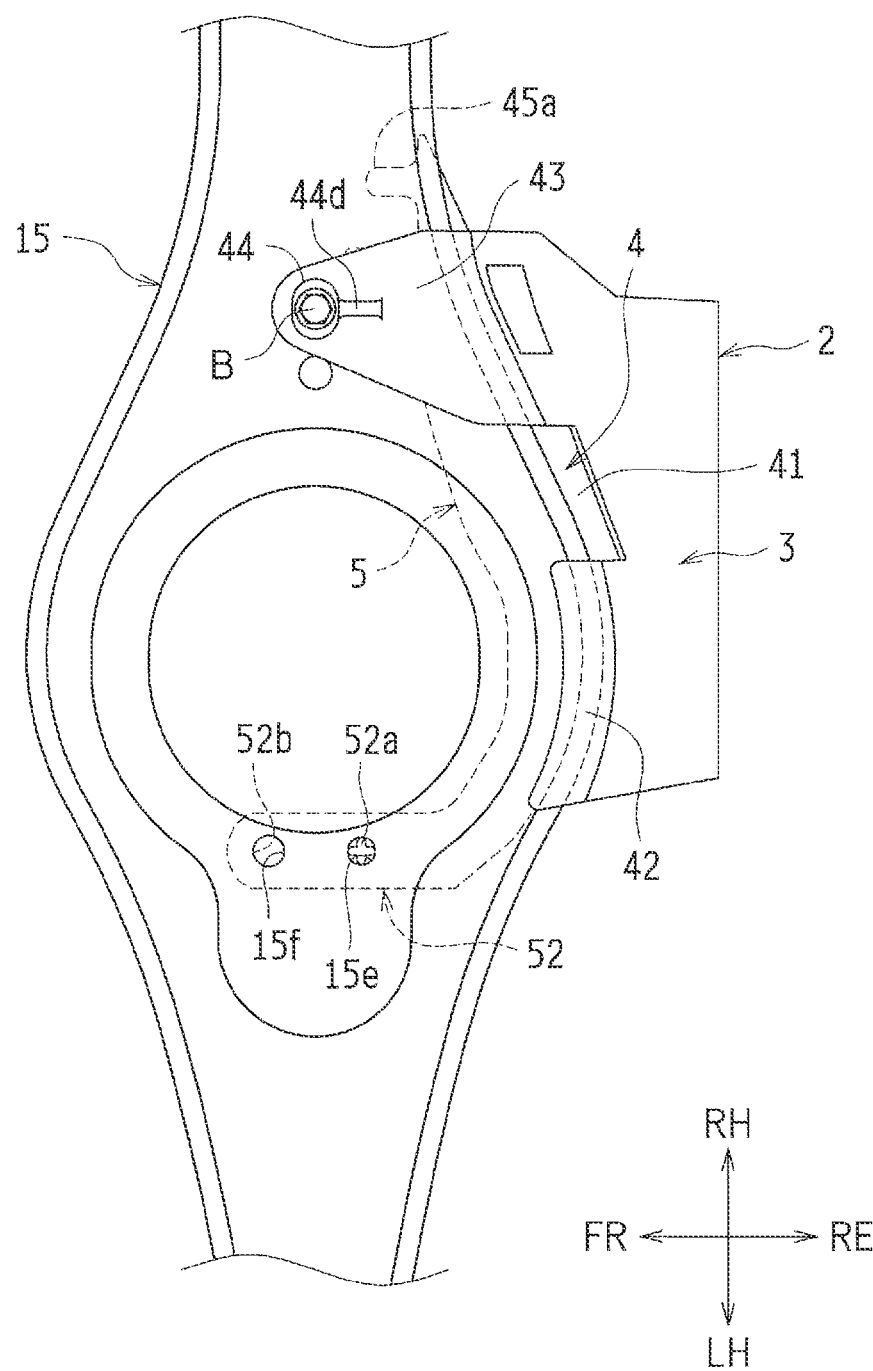
FIG. 2 is a plan view showing a condition in which the aerodynamic cover is mounted on a second lower arm.
Figure 3:
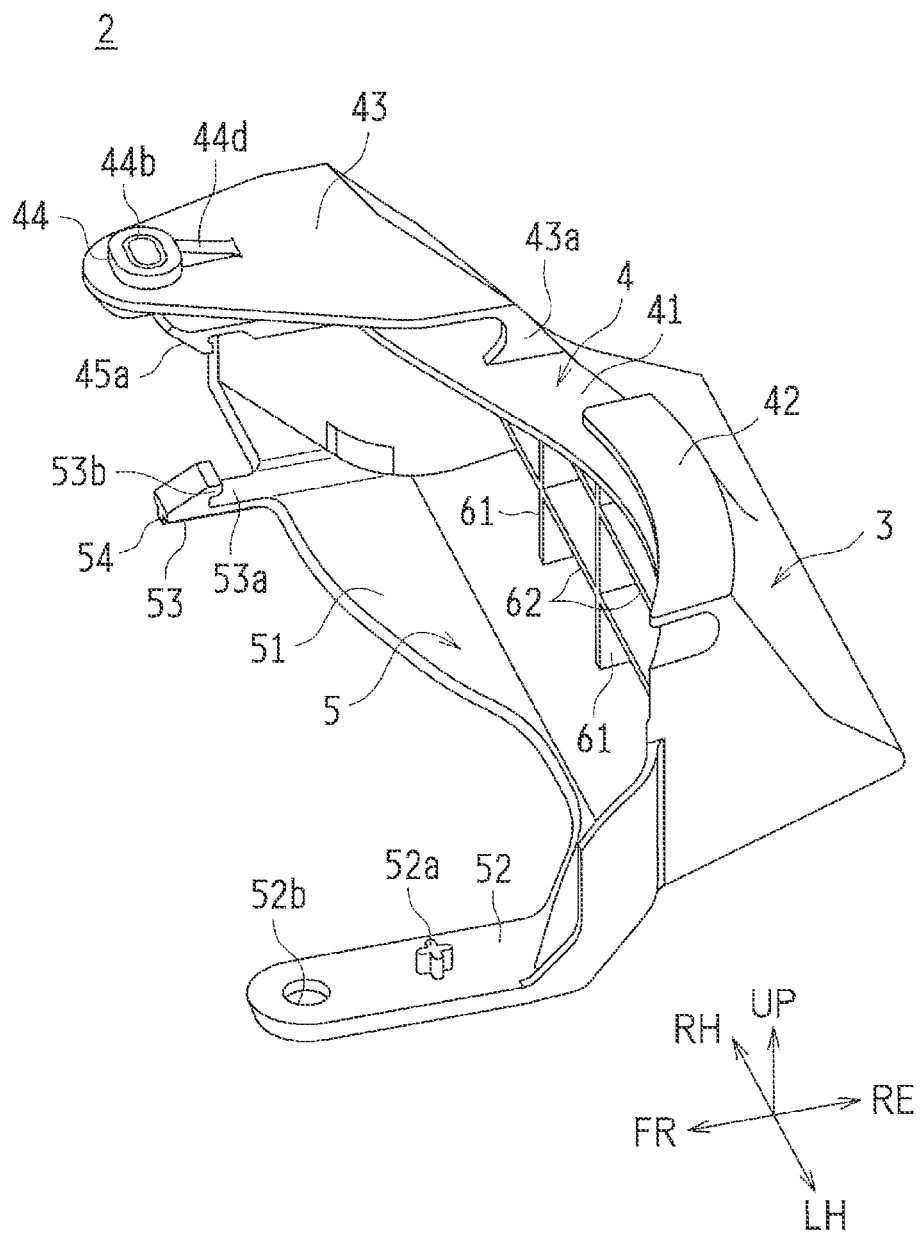
FIG. 3 is a perspective view of the aerodynamic cover.
Figure 4:
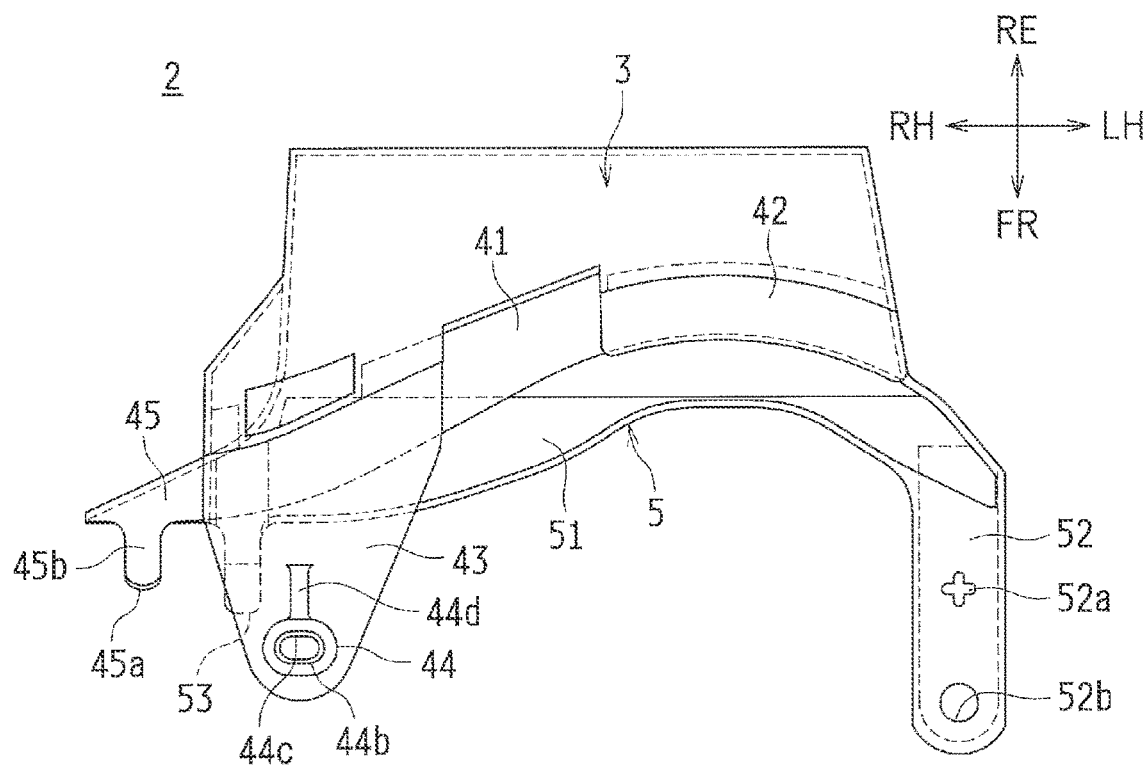
FIG. 4 is a plan view of the aerodynamic cover.
Figure 5:
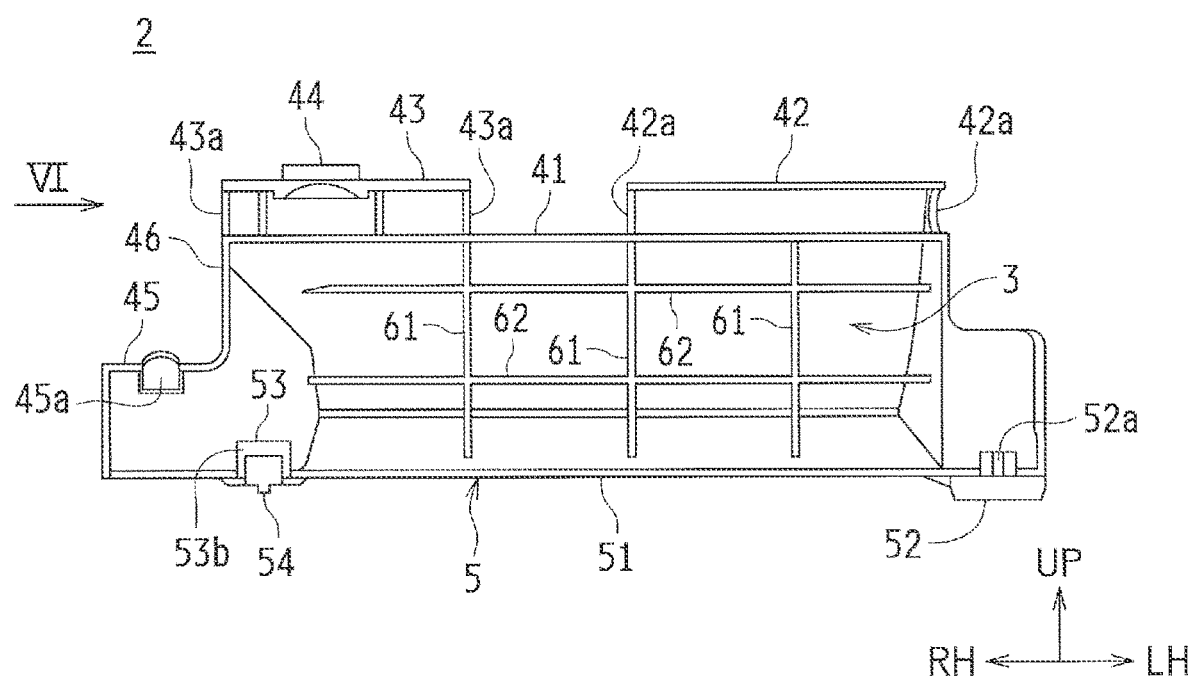
FIG. 5 is a front view of the aerodynamic cover.
Figure 6:
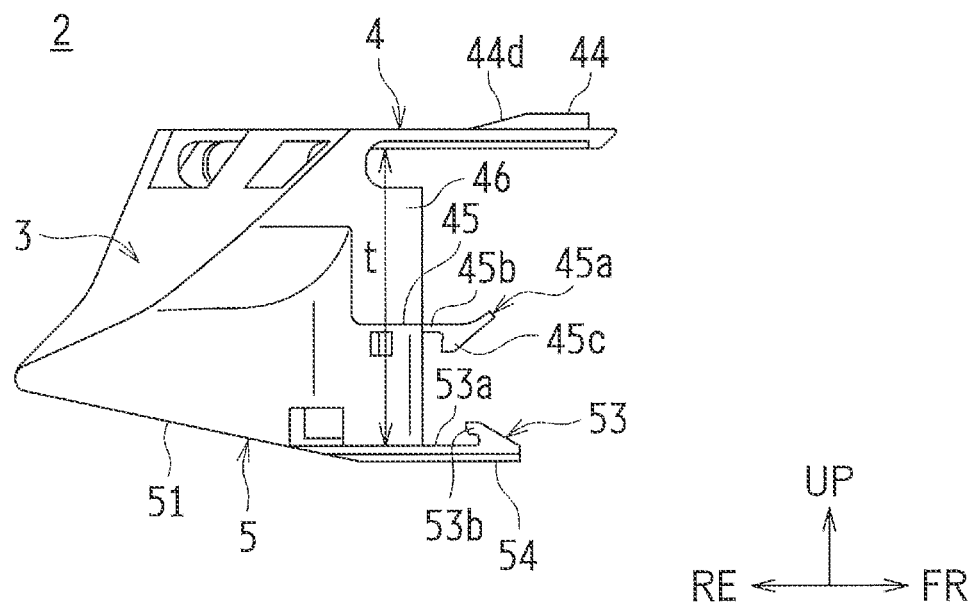
FIG. 6 is a view as seen in a direction of arrow VI in FIG. 5.

Next, the structure of the aerodynamic cover 2 will be described. FIG. 2 is a plan view showing a condition in which the aerodynamic cover 2 is mounted on the second lower arm 15. FIG. 3 is a perspective view of the aerodynamic cover 2. FIG. 4 is a plan view of the aerodynamic cover 2. FIG. 5 is a front view of the aerodynamic cover 2. FIG. 6 is a view of the aerodynamic cover 2 as viewed in a direction of arrow VI in FIG. 5.

As shown in FIG. 1 and FIG. 2, the aerodynamic cover 2 according to this embodiment is mounted on the second lower arm 15, from the rear side in the vehicle longitudinal direction. In FIG. 2 through FIG. 6, too, arrow FR denotes the front direction of the vehicle, arrow RE denotes the rear direction of the vehicle, arrow RH denotes the right-hand direction of the vehicle, arrow LH denotes the left-hand direction of the vehicle, and arrow UP denotes the upper direction. The aerodynamic cover 2 shown in FIG. 1 to FIG. 6 is the one on the right-hand side in the vehicle width direction; thus, the right-hand direction RH in these figures is the outer side in the vehicle width direction, and the left-hand direction LH is the inner side in the vehicle width direction.

As shown in FIG. 2 through FIG. 6, the aerodynamic cover 2 includes a base portion 3, an upper portion 4, and a lower portion 5.

The base portion 3 is inclined at a predetermined inclination angle, in a rear direction from its upper end to its lower end. The upper portion 4 is continuous with the upper end of the base portion 3, and extends in the front direction from the upper end. The lower portion 5 is continuous with the lower end of the base portion 3, and extends in the front direction from the lower end. The lower portion 5 may be regarded as the "lower horizontal portion (one horizontal portion)".

A plurality of ribs 61, 61, 61, 62, 62 is provided over a front surface of the base portion 3, lower surface of the upper portion 4, and upper surface of the lower portion 5, thus assuring sufficiently high rigidity of the aerodynamic cover 2 as a whole. The ribs 61, 62 include three vertical ribs 61, 61, 61 that are spaced at given intervals in the horizontal direction and extend in the vertical direction, and two lateral ribs 62, 62 that are spaced at given intervals in the vertical direction and extend in the horizontal direction. The number of the ribs 61, 62 is not limited to this.

The upper portion 4 has a first upper portion 41 that is continuous with the upper end of the base portion 3 and extends in the front direction, a second upper portion 42 that is continuous with an inner portion of the first upper portion 41 as viewed in the vehicle width direction and is located on the upper side of the first upper portion 41, and a third upper portion 43 that is continuous with an outer portion of the first upper portion 41 as viewed in the vehicle width direction and is located on the upper side of the first upper portion 41.

The first upper portion 41 has a front edge that is curved frontward (in the front direction) toward the outer side in the vehicle width direction. This shape of the front edge conforms to the shape (bulging in the vehicle longitudinal direction) of a rear end face of the second lower arm 15. Namely, in a condition where the aerodynamic cover 2 is mounted on the second lower arm 15, the front edge of the first upper portion 41 abuts against the rear end face of the second lower arm 15 (see FIG. 2).

As shown in FIG. 5, the opposite end portions of the second upper portion 42 as viewed in the vehicle width direction are connected to the upper surface of the first upper portion 41 via connecting portions 42a, 42a that extend in the vertical direction. Thus, as described above, the second upper portion 42 is continuous with the inner portion of the first upper portion 41 as viewed in the vehicle width direction, and is located on the upper side of the first upper portion 41. In this connection, the shape (in planar view) of a front edge of the second upper portion 42 generally conforms to the shape (also in planar view) of the front edge of the first upper portion 41 as described above.

The third upper portion 43 is the "upper horizontal portion (which may be regarded as the other horizontal portion)", and its opposite end portions in the vehicle width direction are connected to the upper surface of the first upper portion 41, via connecting portions 43a, 43a that extend in the vertical direction. Thus, as described above, the third upper portion 43 is continuous with the outer portion of the first upper portion 41 as viewed in the vehicle width direction, and is located on the upper side of the first upper portion 41.

Figure 7:
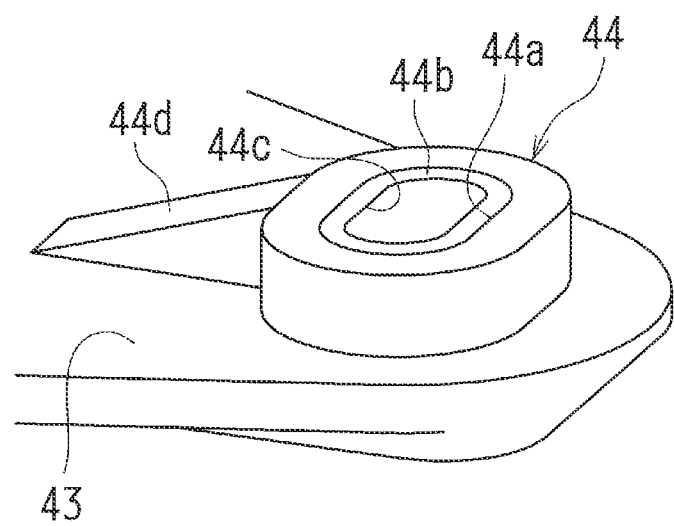
FIG. 7 is a perspective view of a bolt receiving portion as viewed obliquely from the upper side.

The third upper portion 43 extends in the front direction further than the first upper portion 41 and the second upper portion 42, and a bolt receiving portion 44 that receives a bolt for securing the aerodynamic cover 2 to the second lower arm 15 is integrally formed in the vicinity of a front end portion of the third upper portion 43. FIG. 7 is a perspective view of the bolt receiving portion 44 as viewed obliquely from the upper side (the upper side on the outer side in the vehicle width direction). As shown in FIG. 7, the bolt receiving portion 44 is in the form of a boss that protrudes upward. The bolt receiving portion 44 has an elliptical shape in planar view, and an elliptical through-hole 44a is formed in its center portion. Also, a metal fitting 44b having an elliptical shape in planar view is molded to an inner edge of the through-hole 44a, and a through-hole 44c inside the metal fitting 44b provides a bolt insertion hole (through-hole having an elliptical shape) through which the bolt is inserted when the aerodynamic cover 2 is bolted to the second lower arm 15.

A reinforcement rib 44*d* is formed integrally with the bolt receiving portion 44, to extend over its rear portion and the upper surface of the third upper portion 43. The reinforcement rib 44*d* is continuous at its front end with the bolt receiving portion 44 (the rear face of the bolt receiving portion 44), and is continuous at its lower end with the upper surface of the third upper portion 43. Also, the upper surface of the reinforcement rib 44*d* is inclined downward at a given inclination angle, such that the reinforcement rib 44*d* is tapered in the rear direction.

As shown in FIG. 5, a stepped-down portion 45 is provided in an outer portion of the first upper portion 41 as viewed in the vehicle width direction. The stepped-down portion 45 extends outward in the vehicle width direction, from a lower end of a vertical portion 46 that extends in the vertical direction, in the outer portion of the first upper portion 41 as viewed in the vehicle width direction. The stepped-down portion 45 is provided with a first engaging portion 45*a* that is engaged with the second lower arm 15. The first engaging portion 45*a* has an arm portion 45*b* that extends forward (in the front direction) from a front edge of the stepped-down portion 45 as shown in FIG. 6, and a claw portion 45*c* that is continuous with the arm portion 45*b* and protrudes downward. The claw portion 45*c* engages with a portion of the second lower arm 15 from the upper side, thereby to be mounted on a part of the second lower arm 15.

The lower portion 5 has a first lower portion 51 that extends in the front direction, continuously from the lower end of the base portion 3, a second lower portion 52 that extends in the front direction, continuously from an inner portion of the first lower portion 51 as viewed in the vehicle width direction, and a second engaging portion 53 that extends in the front direction, continuously from an outer portion of the first lower portion 51 as viewed in the vehicle width direction.

The first lower portion 51 has a front edge that is curved frontward toward the outer side in the vehicle width direction. The first lower portion 51 is thus shaped so as to cover a lower surface of the second lower arm 15 from the underside. Namely, in a condition where the aerodynamic cover 2 is mounted on the second lower arm 15, the first lower portion 51 partially covers the lower surface of the second lower arm 15, so as to protect the second lower arm 15 against flying stones and curbstones. Also, as shown in FIG. 6, the lower surface of the first lower portion 51 is inclined slightly upward in the rear direction of the vehicle. The first lower portion 51 thus shaped has a function of reducing air resistance (traveling resistance), by regulating air that flows under the vehicle (under the floor) during traveling of the vehicle.

The second lower portion 52 includes a positioning projection 52*a* and a clipped portion 52*b*.

As shown in FIG. 3, the positioning projection 52*a* protrudes upward from an upper surface of a generally middle portion of the second lower portion 52 as viewed in the direction of extension thereof, and has a generally cross shape in planar view. An opening 15*e* (see FIG. 2) having generally the same cross shape as the positioning projection 52*a* is formed at a predetermined position on the lower surface of the second lower arm 15. The positioning projection 52*a* is fitted in the opening 15*e*, from the underside of the second lower arm 15, so that the aerodynamic cover 2 is positioned relative to the second lower arm 15.

The clipped portion 52*b* is a circular opening that is formed in the vicinity of a distal end portion of the second lower portion 52, and extends through the second lower portion 52 in the vertical direction (thickness direction). An opening 15*f* (see FIG. 2) having substantially the same diameter as the clipped portion 52*b* is formed at a predetermined position on the lower surface of the second lower arm 15. The clipped portion 52*b* and the opening 15*f* are aligned with each other, and a clip (not shown) is inserted through the clipped portion 52*b* and the opening 15*f*, so that the second lower portion 52 is attached to the second lower arm 15.

The second engaging portion 53 is engaged with the second lower arm 15 in the same manner as the first engaging portion 45*a* as described above, and has an arm portion 53*a* that extends in the front direction from a front edge of the outer portion of the first lower portion 51 as viewed in the vehicle width direction, and a claw portion 53*b* that is continuous with the arm portion 53*a* and protrudes upward. The upper surface of the arm portion 53*a* is a flat surface. The claw portion 53*b* engages with a portion of the second lower arm 15 from below the arm 15, so as to be attached to a part of the second lower arm 15 (operation for the engagement will be described later).

A distance between the lower surface of the third upper portion 43 and the upper surface of the arm portion 53*a* (dimension "t" in FIG. 6) is substantially equal to the height of the second lower arm 15. Thus, in a condition where the aerodynamic cover 2 is mounted on the second lower arm 15, such that the third upper portion 43 is located on the upper side of the second lower arm 15, and the arm portion 53*a* is located on the underside of the second lower arm 15, the lower surface of the third upper portion 43 is in abutting contact with the upper surface of the second lower arm 15, and the upper surface of the arm portion 53*a* is in abutting contact with the lower surface of the second lower arm 15. Thus, the upper surface of the arm portion 53*a* may be regarded as "first surface" or "flat contact surface that is in abutting contact with the lower surface of the arm member". Also, the lower surface of the arm portion 53*a* corresponds to the "second surface opposite to the first surface".

Figure 8:
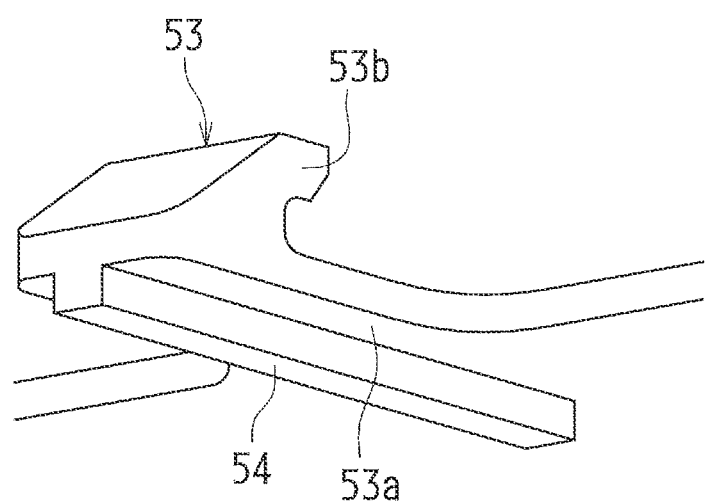
FIG. 8 is a perspective view of a second engaging portion as viewed obliquely from the lower side.

This embodiment is characterized in a reinforcement structure of the second engaging portion 53. FIG. 8 is a perspective view of the second engaging portion 53 when it is viewed obliquely from the lower side (the lower side on the inner side in the vehicle width direction). As shown in FIG. 8, the second engaging portion 53 is provided with a rib 54 that protrudes vertically downward. The rib 54 extends in the direction of extension of the second engaging portion 53 (the vehicle longitudinal direction), on a central portion (as viewed in the vehicle width direction) of the lower surface that extends from the arm portion 53*a* to the claw portion 53*b*.

For example, the dimension of the rib 54 as measured in the vehicle width direction is set to about one-third (⅓) of the dimension of the second engaging portion 53 as measured in the width direction (parallel to the vehicle width direction). Also, the height of the rib 54 is set to be about the same as the thickness of the arm portion 53*a*. Thus, in the second engaging portion 53 (in particular, the arm portion 53*a*), the thickness of its portion provided with the rib 54 is set to be about twice as large as the thickness of its portion that is not provided with the rib 54 (the thickness of the arm portion 53*a*). Thus, the second engaging portion 53 is reinforced, and its strength is increased.

For example, the thickness of the arm portion 53*a* (the thickness of the portion of the second engaging portion 53 which is not provided with the rib 54) is 2.0 mm, and the protruding dimension of the rib 54 that protrudes vertically downward is also 2.0 mm. The ratio of dimensions of the respective portions and the dimensions of the respective portions are not limited to those as indicated above, but may be set as desired. More specifically, the arm portion 53*a* needs to be deformed in an elastic region in operation to install the aerodynamic cover 2 as described later; therefore, the thickness of the arm portion 53*a* and the protruding dimension of the rib 54 are set, so as to make it relatively easy to deform the arm portion 53*a*. Also, the thickness of the arm portion 53*a* and the protruding dimension of the rib 54 are set in view of increase of the weight of the aerodynamic cover 2.

Since the strength of the second engaging portion 53 is increased in this manner, a stable engaging condition can be maintained, even if the arm portion 53*a* of the second engaging portion 53 becomes worn (the upper surface of the arm portion 53 becomes worn), due to sliding motion of the arm portion 53*a* of the second engaging portion 53 and the second lower arm 15 relative to each other due to vibration of the vehicle, for example.

Installation of Aerodynamic Cover

Figure 9A:
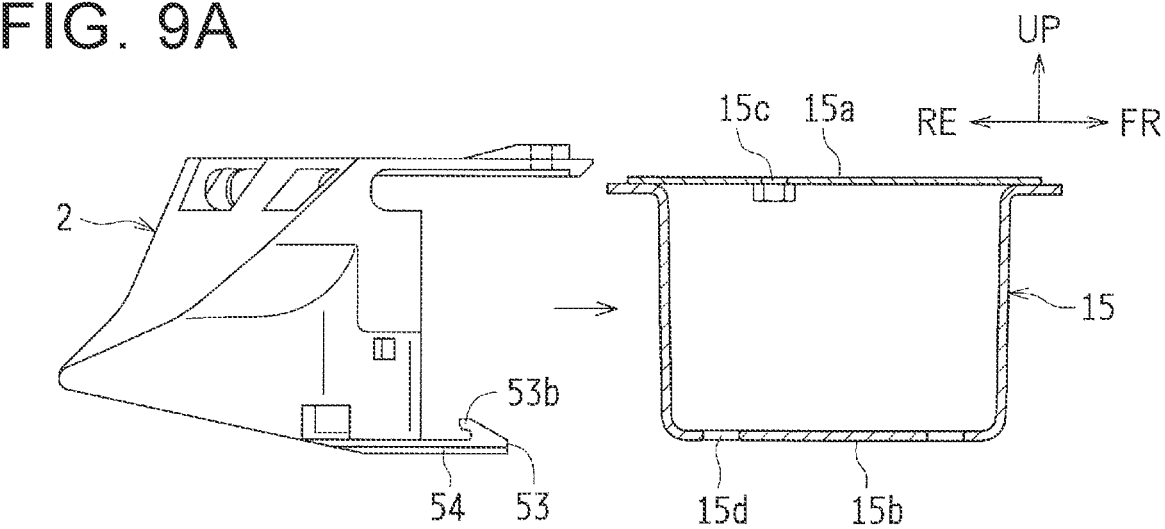
FIG. 9A is one of side views illustrating operation to mount the aerodynamic cover on the second lower arm.
Figure 9B:
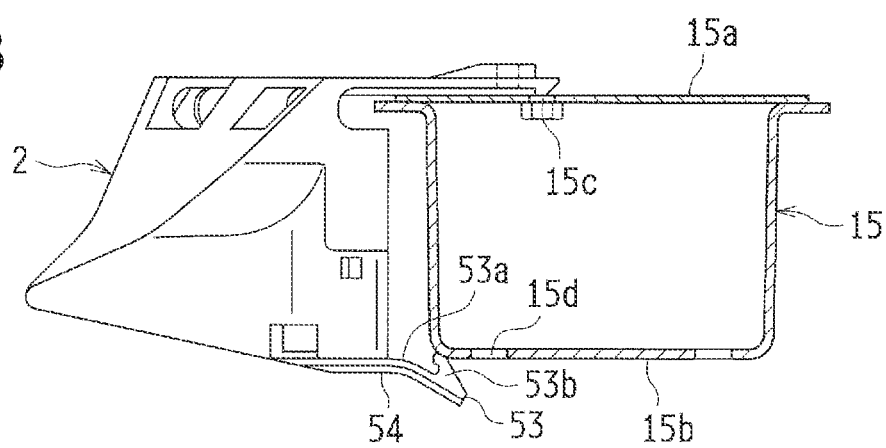
FIG. 9B is one of side views illustrating operation to mount the aerodynamic cover on the second lower arm.
Figure 9C:
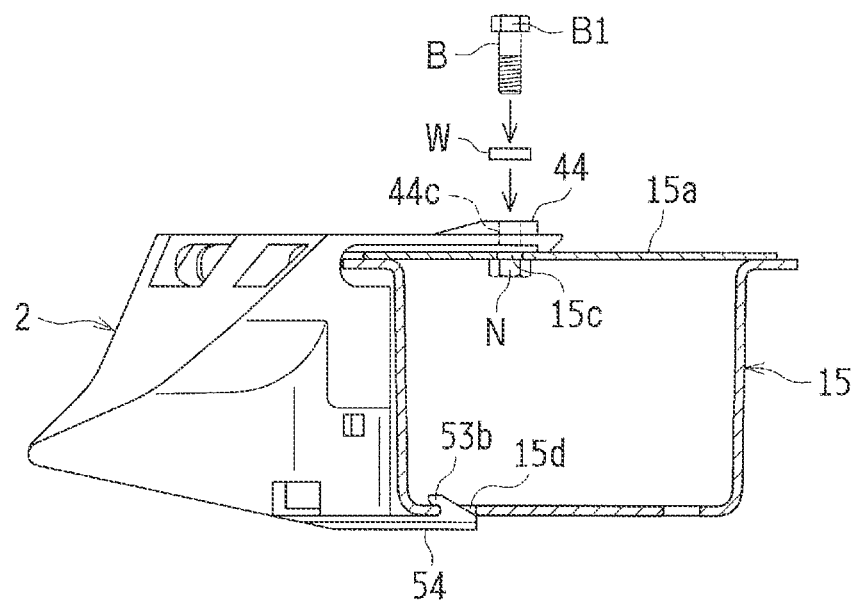
FIG. 9C is one of side views illustrating operation to mount the aerodynamic cover on the second lower arm.

Next, installation operation to mount the aerodynamic cover 2 constructed as describe above on the second lower arm 15 will be described. FIG. 9A to FIG. 9C are side views (as seen from the outer side in the vehicle width direction) illustrating the operation to mount the aerodynamic cover 2 on the second lower arm 15. In FIG. 9A to FIG. 9C, arrow FR denotes the front direction of the vehicle, arrow RE denotes the rear direction of the vehicle, and arrow UP denotes the upper direction.

As shown in FIG. 9A, the aerodynamic cover 2 is attached to a predetermined area of the second lower arm 15 (in this embodiment, an area that extends from the rear side of a portion supporting the coil spring 17 to the outer side in the vehicle width direction; see FIG. 2), from the rear side of the arm 15. The second lower arm 15 of this embodiment has a closed cross-section structure formed by integrally joining the upper member 15*a* and the lower member 15*b* as shown in FIG. 9A. In the second lower arm 15 shown in FIG. 9A, the upper member 15*a* is in the form of a flat plate, and the lower member 15*b* has a so-called hat shape in cross section. The upper member 15*a* is formed with a bolt insertion hole 15*c* through which the bolt B is inserted when the third upper portion 43 of the aerodynamic cover 2 is bolted to the upper member 15*a*. The lower member 15*b* is formed with an engaging hole 15*d* with which the claw portion 53*b* of the second engaging portion 53 is engaged.

In the installation operation, the aerodynamic cover 2 is moved so that the second lower arm 15 is fitted in between the third upper portion 43 and second engaging portion 53 of the aerodynamic cover 2. Then, when the aerodynamic cover 2 is brought into contact with a rear end portion of the second lower arm 15, the claw portion 53*b* of the second engaging portion 53 of the aerodynamic cover 2 comes into contact with the lower end (a corner portion on the rear side) of the lower member 15*b*. In this condition, the aerodynamic cover 2 is pushed against the second lower arm 15 (pushed to the right in FIG. 9B), so that the arm portion 53*a* receives reaction force from the lower member 15*b*, and is deformed downward (deformed in an elastic region).

Then, as the aerodynamic cover 2 is further pushed against the second lower arm 15, the claw portion 53 rides over the rear end portion of the second lower arm 15, and engages with the engaging hole 15*d* from the underside. In this condition, the claw portion 53*b* catches an opening edge of the engaging hole 15*d*, so that the aerodynamic cover 2 is prevented from being detached in the vehicle rear direction. Although not illustrated in the drawings, the first engaging portion 45*a* is also engaged with a predetermined location of the second lower arm 15 in like manner. Also, in this condition, the bolt receiving portion 44 formed on the third upper portion 43 of the aerodynamic cover 2 is located above the bolt insertion hole 15*c*. Namely, the through-hole 44*c* of the metal fitting 44*b* molded to the bolt receiving portion 44 is kept aligned with the bolt insertion hole 15*c* of the upper member 15*a*.

Then, a washer W is placed on the upper face of the bolt receiving portion 44, and the bolt B is inserted through the through-hole 44*c* and the bolt insertion hole 15*c*, from the upper side of the bolt receiving portion 44. The bolt B is then screwed into a nut N placed on the lower surface of the upper member 15*a* (for example, welded to the lower surface of the upper member 15*a*), so that the bolt receiving portion 44 is bolted to the upper member 15*a*. In this manner, the outer portion of the aerodynamic cover 2 as viewed in the vehicle width direction is attached to the second lower arm 15, via the lower engaged part and the upper bolted part.

On the other hand, although not illustrated in FIGS. 9A-9C, the positioning projection 52*a* formed on the upper surface of the second lower portion 52 is fitted, from the underside, into the opening 15*e* of the second lower arm 15, so that the second lower portion 52 is positioned relative to the second lower arm 15.

Also, the opening 15*f* formed in the second lower arm 15 and the clipped portion 52*b* are aligned with each other, and a clip (not shown) is fitted in both the opening 15*f* and the clipped portion 52*b*, so that the second lower portion 52 is attached to the second lower arm 15. Thus, the inner portion of the aerodynamic cover 2 as viewed in the vehicle width portion, as well as the outer portion, is attached to the second lower arm 15.

Through the above operation, the aerodynamic cover 2 is mounted on the second lower arm 15, using only one bolted part where the cover 2 is bolted to the second lower arm 15.

Effects of the Embodiment

As described above, in this embodiment, the lower portion 5 of the aerodynamic cover 2 is provided with the second engaging portion 53 engaged with the second lower arm 15, and the second engaging portion 53 is provided with the rib 54 that extends in the direction of extension of the portion 53 (the vehicle longitudinal direction) and protrudes vertically downward. Namely, no bolted part is present in the lower portion 5, and the number of bolted parts can be reduced, resulting in reduction of the time required for screwing the bolt B in operation to install the aerodynamic cover 2. Also, the presence of the rib 54 leads to increase in the strength of the arm portion 53*a*. Thus, even if the second engaging portion 53 becomes worn due to sliding motion of the arm portion 53*a* of the second engaging portion 53 and the second lower arm 15 relative to each other due to vibration of the vehicle, for example, a stable engaging condition can be maintained, and the aerodynamic cover 2 can be kept in a stably mounted condition.

Also, in this embodiment, the arm portion 53*a* of the second engaging portion 53 has a flat upper surface (first surface) that is in abutting contact with the lower surface of the second lower arm 15, and a lower surface (second surface) opposite to the first surface, and the rib 54 protrudes downward in a vertical direction perpendicular to the second surface. Thus, the second engaging portion 53 can be stably held in contact with the second lower arm 15. Namely, it is possible to keep the aerodynamic cover 2 in a stably mounted condition due to the presence of the rib 54, while stably holding the second engaging portion 53 in contact with the second lower arm 15.

Also, in this embodiment, the bolt receiving portion 44 protrudes in the vertical direction (vertically upward) from a surface (upper surface) of the third upper portion 43, away from the second lower arm 15, and is bolted to the second lower arm 15, such that an end face of the bolt receiving portion 44 located on the outer side in the direction of protrusion thereof provides a seating face with which the head portion B1 of the bolt B contacts. Thus, even in a situation where the head portion B1 of the bolt B presses the seating face (end face of the bolt receiving portion 44) and causes it to wear, due to fastening force applied during bolt fastening, the head portion B1 of the bolt B is less likely or unlikely to contact with the surface of the third upper portion 43. Namely, the surface of the third upper portion 43 is less likely to or unlikely to be worn by the bolt B. Thus, the rigidity of the third upper portion 43 is kept high (the rigidity of the aerodynamic cover 2 is kept high), and the effects (reduction of air resistance and protection of the suspension system 1) provided by installation of the aerodynamic cover 2 can be favorably exhibited.

Other Embodiments

This disclosure is not limited to the above embodiment, but may be embodied with any of all modifications and applications encompassed by the appended claims and equivalents thereof.

In the illustrated embodiment, the disclosure is applied to the aerodynamic cover 2 mounted on the second lower arm 15 of the suspension device 1 that suspends a rear wheel of the vehicle. However, this disclosure is not limited to this application, but the aerodynamic cover 2 may be mounted on another arm member (e.g., the first lower arm 14). The disclosure may also be applied to an aerodynamic cover mounted on a lower arm of a suspension device that suspends a front wheel of the vehicle.

In the illustrated embodiment, the upper portion 4 of the aerodynamic cover 2 is provided with the bolt receiving portion 44, and the lower portion 5 is provided with the second engaging portion 53. However, the disclosure is not limited to this arrangement, but the upper portion 4 of the aerodynamic cover 2 may be provided with the second engaging portion, and the lower portion 5 may be provide with the bolt receiving portion. In this case, the rib protrudes from the upper surface of the second engaging portion.

Also, in the illustrated embodiment, the rib 54 is provided on the lower surface that extends from the arm portion 53*a* to the claw portion 53*b*. However, the disclosure is not limited to this arrangement, but the rib 54 may be provided only on the lower surface of the arm portion 53*a* (namely, no rib is provided on the lower surface of the claw portion 53*b*).

The bolt receiving portion 44 is not necessarily in the form of a boss that protrudes upward.

The disclosure may be applied to an aerodynamic cover mounted on a lower arm of a suspension device of a vehicle.

What is claimed is:

1. An aerodynamic cover mounted on an arm member of a suspension device of a vehicle, comprising:
   an upper horizontal portion that is located on an upper side of the arm member and extends in a horizontal direction;
   a lower horizontal portion that is located on a lower side of the arm member and extends in the horizontal direction;
   an engaging portion provided on one horizontal portion of the upper horizontal portion and the lower horizontal portion, the engaging portion being engaged with the arm member; and
   a bolt receiving portion provided on the other horizontal portion of the upper horizontal portion and the lower horizontal portion, the bolt receiving portion being bolted to the arm member,
   wherein the engaging portion includes an arm portion that extends in the horizontal direction, and a claw portion that is provided on a distal side of the arm portion and is engaged with the arm member, and
   a rib is provided on at least the arm portion of the engaging portion, such that the rib extends in a direction of extension of the arm portion, and protrudes in a vertical direction with respect to the arm portion.

2. The aerodynamic cover according to claim 1, wherein:
   the engaging portion is provided on the lower horizontal portion;
   the arm portion includes a first surface, and a second surface opposite to the first surface, the first surface being a flat contact surface that is in abutting contact with a lower surface of the arm member; and
   the rib protrudes from the second surface downward in the vertical direction perpendicular to the second surface.

3. The aerodynamic cover according to claim 1, wherein:
   the bolt receiving portion protrudes in the vertical direction from a surface of the other horizontal portion opposite to the arm member; and
   the bolt receiving portion is secured to the arm member with a bolt, such that an end face of the bolt receiving portion which is located on an outer side as viewed in a direction of protrusion of the bolt receiving portion provides a seating face with which a head portion of the bolt contacts.

* * * * *